(12) United States Patent
Fisher

(10) Patent No.: US 10,000,416 B2
(45) Date of Patent: Jun. 19, 2018

(54) LIGHTWEIGHT GYPSUM PRODUCTS HAVING ENHANCED WATER RESISTANCE

(75) Inventor: Robin Daniel Fisher, Coventry (GB)

(73) Assignee: BPB Limited, Coventry (GB)

( * ) Notice: Subject to any disclaimer, the term of this patent is extended or adjusted under 35 U.S.C. 154(b) by 0 days. days.

(21) Appl. No.: 13/513,153

(22) PCT Filed: Dec. 2, 2010

(86) PCT No.: PCT/GB2010/052011
§ 371 (c)(1),
(2), (4) Date: Sep. 7, 2012

(87) PCT Pub. No.: WO2011/067601
PCT Pub. Date: Jun. 9, 2011

(65) Prior Publication Data
US 2012/0322904 A1 Dec. 20, 2012

(30) Foreign Application Priority Data

Dec. 4, 2009 (GB) .................................. 0921293.7

(51) Int. Cl.
| | | |
|---|---|---|
| *C04B 28/14* | (2006.01) | |
| *C04B 28/16* | (2006.01) | |
| *C04B 111/00* | (2006.01) | |
| *C04B 111/27* | (2006.01) | |

(52) U.S. Cl.
CPC ............ *C04B 28/146* (2013.01); *C04B 28/16* (2013.01); *C04B 2111/0062* (2013.01); *C04B 2111/27* (2013.01); *Y02W 30/97* (2015.05)

(58) Field of Classification Search
CPC ......... C04B 24/08; C04B 11/30; C04B 16/08; C04B 38/106; B29K 2105/165
USPC .................................................. 521/139, 130
See application file for complete search history.

(56) References Cited

U.S. PATENT DOCUMENTS

| | | | | |
|---|---|---|---|---|
| 1,923,370 A | * | 8/1933 | Hansen .................... | C04B 11/30 106/703 |
| 2,212,811 A | * | 8/1940 | Hann ...................... | C04B 11/30 106/654 |
| 4,655,837 A | * | 4/1987 | Jong ........................ | C04B 28/26 106/601 |
| 5,424,099 A | * | 6/1995 | Stewart et al. ............ | 427/397.7 |
| 5,685,903 A | | 11/1997 | Stav et al. | |
| 6,241,815 B1 | | 6/2001 | Bonen | |
| 6,641,658 B1 | | 11/2003 | Dubey | |
| 2004/0092676 A1* | | 5/2004 | Savoly et al. ................. | 525/535 |
| 2005/0183632 A1 | | 8/2005 | Sturre | |
| 2006/0035112 A1 | | 2/2006 | Veeramasuneni et al. | |
| 2006/0147681 A1 | | 7/2006 | Dubey | |
| 2006/0278129 A1* | | 12/2006 | Liu .......................... | C04B 28/14 106/661 |
| 2008/0156581 A1* | | 7/2008 | Englert et al. ................. | 181/290 |

FOREIGN PATENT DOCUMENTS

| | | | |
|---|---|---|---|
| AU | 663516 B2 | | 10/1995 |
| CN | 101549988 A | | 10/2009 |
| DE | 63320 | | 8/1968 |
| DE | 125405 A | * | 4/1977 |
| GB | 1418146 A | | 12/1975 |
| GB | 2193203 A | | 2/1988 |
| JP | S48103620 | | 12/1973 |
| JP | S50027822 | | 3/1975 |
| JP | S56054263 | | 5/1981 |
| JP | 05201757 A | * | 8/1993 |
| JP | H05201757 A | | 8/1993 |
| JP | 2008526665 | | 7/2008 |
| MX | PA00009587 A | | 3/2003 |
| WO | 8908623 A | | 9/1989 |
| WO | 2008100777 A2 | | 8/2008 |
| WO | 2008152519 A2 | | 12/2008 |

OTHER PUBLICATIONS

Gartner, E. "Industrially interesting approaches to "low-CO2" cements" Cement and Concrete Research 34 (2004) 1489-1498.*
Mayer, H. "Masonry Protection with Silanes, Siloxanes, and Silicone Resins" in Surface Coatings International 1998. p. 89-93.*
Majumdar, A.J. "Glass Fibre Reinforced Cement and Gypsum Products" Proceedings of the Royal Society of London, Series A. vol. 319 (1970), No. 1536 pp. 69-78.*
Wisegeek.com. "What is Drywall?" Accessed via internet archive wayback machine (www.webarchive.org) to Mar. 19, 2008. Website: http://www.wisegeek.com/what-is-drywall.htm.*
Machine translation of CN 101549988A by Chen.*
Yan Chen, Gypsum Composite Gel Materials, Gypsum Building Materials, China Building Material Press, pp. 222-223, 227-228, 1st edition, Mar. 2003.

* cited by examiner

*Primary Examiner* — Randy P Gulakowski
*Assistant Examiner* — Christina H Wales
(74) *Attorney, Agent, or Firm* — GrayRobinson, P.A.; Michael J. Colitz, III

(57) ABSTRACT

The product is produced from a settable aqueous calcium sulphate dispersion which has a water to solids ratio of less than 0.4 to 1, and has distributed therethrough lightweight hollow bodies having water-impervious surfaces (such as expanded polystyrene beads). The dispersion contains a hydratable cement (such as calcium sulpho aluminate) which is capable of hydration in the presence of the calcium sulphate dispersion. The hydratable cement is such that it reacts with excess water in the dispersion thereby enhancing the water resistance of the resulting product.

20 Claims, No Drawings

LIGHTWEIGHT GYPSUM PRODUCTS HAVING ENHANCED WATER RESISTANCE

CROSS-REFERENCE TO RELATED APPLICATIONS

This application claims priority under 35 USC § 371 to International Application No. PCT/GB2010/052011, filed Dec. 2, 2010, which itself claimed priority to GB 0921293.7, filed Dec. 4, 2009. The contents of both aforementioned applications are incorporated herein by reference.

BACKGROUND OF THE INVENTION

Field of the Invention

The present invention relates to gypsum products having exposed surfaces and provides such products with enhanced water resistance.

Description of the Background Art

Gypsum products including gypsum blocks, paperless gypsum board, and also gypsum facings, can suffer from water absorption, especially where the products are intended for use in a wet or damp environment, because such products have exposed surfaces which are susceptible to water ingress.

A standard method of testing "moisture resistant" wallboard requires it to have a water absorption not greater than 5%—for example, expressed as the weight percentage of water absorbed by a 300 mm×300 mm board sample immersed in water at 20° C. for two hours. Such moisture resistant board can be used in situations where there is a risk of limited exposure of the board to moisture.

In order to achieve moisture resistance, it has been suggested that a hydrophobic additive may be incorporated into the plaster slurry employed to form the board.

For example, the hydrophobic additive may be a silicone, as described in our European Patent 957070; the use of such a hydrophobic additive requires thermal curing, and it would be advantageous to avoid the requirement for energy input that such thermal curing implies. Latex copolymers have also been proposed in WO2008/152519, but it is not clear that the resulting plaster has long term water resistance.

It remains desirable to increase the mechanical properties of set gypsum products under wet conditions, and produce such products with lowered open porosity as this property will enhance water-resistance.

In particular, there is a need for water-resistant gypsum products having improved strength properties after prolonged contact with water and which can be produced with a mild drying regime.

SUMMARY OF THE INVENTION

According to the present invention there is provided a method of producing a water-resistant gypsum product, in which the gypsum product is produced from a settable aqueous calcium sulphate dispersion having a water to solids ratio of less than 0.4 to 1, the dispersion having distributed therethrough lightweight hollow bodies having water-impervious surfaces; and a hydratable cement (such as calcium sulpho aluminate) which is capable of hydration in the presence of the calcium sulphate dispersion, the hydratable cement being reactive with excess water in the dispersion. The hydratable cement thereby reacts with water, preferably without significant thermal input, so as to fill pores which might otherwise result from the presence of excess water during curing.

The hydratable cement is typically a calcium sulpho aluminate cement, which is such that it reacts with water in the dispersion to form ettringite.

The hydratable cement is present in an amount sufficient to react with excess water resulting from reaction of the calcium sulphate with the water, such as from 5 to 15% by weight, based on the weight of the hydraulic powder (that is, on the weight of settable solids in the calcium sulphate dispersion, including the hydratable cement). A more preferred amount is about 10%, such as 8 to 12% on the same basis.

The calcium sulphate in the dispersion is typically one known to be suitable for a low water demand plaster; examples include alpha plaster, anhydrite II or anhydrite III. The dispersion may further contain other materials to minimise the water demand thereof, such as one or more superplasticisers. The calcium sulphate may alternatively be beta plaster with a high performance superplasticiser.

The lightweight hollow bodies may be, for example, beads of expanded polystyrene, granulated cork, hollow spheres, or spheres made by a polymer foam polymerised post-setting such that the spheres are impervious to water. The hollow bodies each have one or more voids or closed cavities, the voids or cavities in each body being of a closed pore nature (that is not permitting gas and/or liquid communication to the surface of the respective body). In each such body, the voids or cavities are surrounded by the water-impervious surface of the hollow body. The hollow bodies are typically present in an amount of 0.5 to 2% by weight, based on the weight of the hydraulic powder.

In some embodiments of the invention, it is particularly preferred that the dispersion contains at least one additive having substantial hydrophobic character; such an additive is typically at least one amphiphilic compound, such as a soap. Preferred examples of such soaps are salts of long chain fatty acids, such as stearates of calcium, zinc, magnesium and/or aluminium. Such soaps contain a hydrocarbon chain (which contributes to the hydrophobic character) and also a carboxylic salt group (which contributes to the hydrophilic character)—hence why they can be characterised as amphiphiles. A preferred amount thereof is from 1 to 15%, based on the weight of the hydraulic powder.

The dispersion may further contain a water repellent agent that cures to form a hydrophobic silicone resin in an alkaline environment. Such examples are alkyl/vinyl alkoxysilanes, alkyl/vinyl siloxanes, alkyl/vinyl silanols, alkyl siliconates and mixtures thereof. Suitable examples commercially available are Wacker Silres BS16 and BS1260. In some embodiments, the water repellent agent, or a precursor thereof, may be in powder form.

The dispersion may further contain fibrous reinforcement, such as, in particular, glass fibre reinforcement; it is especially preferred when glass fibre reinforcement is present that the dispersion also contains a water repellent agent such as that described in the preceding paragraph.

The solids used to make up the dispersion may be provided in the form of dry ingredients, to be made up in situ with water so as to form the dispersion. Such a dry mix can be provided for casting lightweight blocks in situ.

In use, the dispersion is allowed to set to form a plaster body, such as a block or a board, or a facing layer applied to a wall surface or the like.

When gypsum board is produced according to the invention, the board may be with or without surface reinforcement or liner sheets; when surface reinforcement is used, the latter may, for example, be of fibre scrim, fibre mesh or paper.

It is particularly preferred that the bodies are produced without externally applied heating to cause drying thereof, which may be a further advantage due to the high energy costs in normal gypsum board production (both in the direct purchase of the energy and in the offsetting of $CO_2$ emissions off-setting); products according to the invention therefore can have lowered embodied energy.

Other non-deleterious materials, adjuvants and ingredients may, when appropriate, be present in the dispersion. Such non-deleterious materials may include optional further ingredients, such as starch, set accelerators and retarders, deformation inhibitors (such as anti-sagging agents), anti-shrink additives, recalcination inhibitors, foam stabilisers, bactericides, fungicides, pH adjusters, colouring agents, fire retardants and fillers (such as particulate mineral material or plastics, which may in some embodiments be in expanded form).

The pH of the dispersion used according to the invention is typically in the range 10 to 13.

The present invention extends to gypsum building products such as blocks, wallboard, facings or the like when produced by a method according to the invention, especially such products for use in an outdoor environment and such products which are subject to rain or other contact with water, such as with a body of water.

Certain advantageous features of the invention and the way it can be put into operation are now illustrated in the following worked illustrative Examples.

EXAMPLE 1

Laboratory samples were produced using a Kenwood KM300 Chef Mixer, with planetary mixing action. The hydraulic material was pure α plaster (Saint-Gobain Formula, 'Crystacal Base') or a 9:1 blend of α plaster: Belitex CSA cement. The density was reduced with 1 mm diameter Expanded Polystyrene Beads at 1.2% w:w of hydraulic material dry blended in a plastic bag. The calcium stearate powder, namely "SM-Microfine" grade available from FACI (UK), was also blended at this stage in subsets 1.3 and 1.4. Tap water was pre-heated to 40° C. to replicate a typical plant slurry temperature when mixed with the powder. The water was weighed at 0.35:1, water:solid powder and added to the mixing bowl first, followed by the liquid hydrophobic additive BS1260 in the subsets 1.5 and 1.6.

The hydraulic material with EPS beads was poured on the liquid over 30 seconds, left to stand for 30 seconds and mixed over one minute starting at setting 1 and ramping up the speed incrementally each 10 seconds of mixing until finishing on setting 6. The slurry was deposited into a silicone rubber mould to cast 6× cuboids measuring 20 mm×20 mm×100 mm. After hydration of the plaster was complete (this was typically 1 hour and was determined by temperature measurement) the samples were de-moulded and then sealed for 48 hours in a plastic bag to allow the CSA to hydrate further. The samples were then dried at 40° C. for 12 hours or more. Preparation included cutting 5 mm off the edges using a bandsaw to expose the core, then conditioning in a chamber at 23° C./50% RH for 12 hours or more. The weight and dimensions were taken at this point to give the initial weight and density.

The results obtained are shown in the following Table 1.

TABLE 1

| Ref | Hydraulic powder | Water repellent additive | Average dry density (kg/m³) | Water uptake (%) | | |
|---|---|---|---|---|---|---|
| | | | | 2 hrs | 24 hrs | 72 hrs |
| 1.1 | α plaster | None | 733 | 16.5 | 16.3 | 16.1 |
| 1.2 | α plaster + CSA (9:1) | None | 783 | 12.4 | 12.2 | 12.2 |
| 1.3 | | 1% calcium stearate | 800 | 9.1 | 10.3 | 10.0 |
| 1.4 | | 5% calcium stearate | 757 | 5.1 | 8.7 | 8.7 |
| 1.5 | | 0.1% Wacker BS1260 | 717 | 5.8 | 8.2 | 10.0 |
| 1.6 | | 0.5% Wacker BS1260 | 749 | 1.5 | 2.6 | 3.1 |

EXAMPLE 2 (COMPARATIVE)

For comparative purposes, a commercially available piece of Glasroc was obtained from Saint-Gobain Gyproc. Polymethylhydrogensiloxane was added to the glass reinforced product at the mixer stage and coated with a polymer for further protection against surface water ingress. It was cut into 125 mm×125 mm pieces for water absorption testing. Results are shown in comparison to those from Example 3 in Table 2.

EXAMPLE 3

The method used was the same as detailed in Example 2, apart from the following differences.

The hydraulic powder was a 9:1 blend of α plaster:CSA cement. Gauging water at 40° C. was slightly higher than in Example 1, at water:solids ratio of 0.4. An excess of slurry was deposited into two moulds with a glass tissue facing material from Johns Manville beneath. The mould made with brass square section measuring 152 mm×152 mm×12.5 mm (internal dimensions). A top piece of glass tissue was then placed on top of the slurry, which was forced through by sliding a metal bar across, thus impregnating the tissue. The mould was weighted down between two Perspex sheets.

After hydration, the samples were de-moulded and dried at 60° C., 20% RH in a Vötsch climatic chamber for 12 hours. Preparation included cutting off the edges using a bandsaw to expose the core and produce samples 114-122 mm in length and width.

The results of water absorption tests are shown in Table 2. The results of wet strength tests are shown in Table 3.

TABLE 2

| Ref | Hydraulic powder | Water repellent additive | Average dry density (kg/m³) | Water uptake (%) 2 hrs | 24 hrs | 72 hrs | 240 hrs |
|---|---|---|---|---|---|---|---|
| 2 | β plaster | Polmethyl hydrogensiloxane | 709 | 2.7 | 40.3 | 51.8 | 64.4 |
| 3.1 | α plaster + CSA (9:1) | None | 846 | 15.2 | 15.9 | 16.2 | 17.1 |
| 3.2 |  | 0.25% Wacker BS1260 | 823 | 6.1 | 9.8 | 11.9 | 15.9 |
| 3.3 |  | 0.5% Wacker BS1260 | 793 | 4.7 | 5.8 | 6.8 | 9.7 |

TABLE 3

| Ref | Hydraulic powder | Water repellent additive | Wet strength (Average; N) | Wet strength error (1 standard deviation; N) |
|---|---|---|---|---|
| 2 | β plaster | Polmethyl hydrogensiloxane | 18.7 | 1.3 |
| 3.1 | α plaster + CSA (9:1) | None | 120.6 | 11.6 |
| 3.2 |  | 0.25% Wacker BS1260 | 95.7 | 6.4 |
| 3.3 |  | 0.5% Wacker BS1260 | 99.4 | 10.0 |

Water Absorption Test

The water absorption test was done on by immersing the samples in tap water at 23° C. such that a head of water of 30 mm between the top of the sample and water line was maintained. After given time periods the samples were removed and the excess water blotted before re-weighing. The method used was the same as that given in EN520: 2004 section 5.9.2, but the sample size was smaller and longer immersion times than 2 hours were used to demonstrate the improved water resistance of the invention. Example 1 results are averages from triplicate measurements, whereas Examples 2 and 3 are from duplicate measurements.

Wet Strength Test

The wet strength of the samples immersed for 240 hours (that is, saturated samples) was determined using a method similar to ASTM-C 473 section 12 for core and edge hardness measurements of gypsum panels. The maximum force required to drive a 2 mm diameter steel punch (ASTM-C 473 specifies 2.5 mm) through 13 mm of the sample was measured with a Mecmesin force gauge at a crosshead speed of 30 mm/min. The test was repeated around the sample edge 16 times to determine the average.

What is claimed is:

1. A method of producing a lightweight, water-resistant gypsum product, the method comprising:
    forming a gypsum building product selected from gypsum wallboard and gypsum wall facing by combining with water to produce a settable aqueous calcium sulphate dispersion:
    a settable calcium sulphate, lightweight hollow bodies having water-impervious surfaces, and
    a hydratable cement which is capable of hydration in the settable aqueous calcium sulphate dispersion, the hydratable cement being reactive with excess water in the dispersion; and
    allowing the settable aqueous calcium sulphate dispersion to set into the gypsum building product;
    wherein the settable aqueous calcium sulphate dispersion has a water to solids ratio of less than 0.4 to 1 and the hydratable cement is 8% to 12% of the settable aqueous calcium sulphate dispersion, based on the weight of the settable solids in the settable aqueous calcium sulphate dispersion;
    wherein the settable aqueous calcium sulphate dispersion contains a water repellent agent that cures to form a hydrophobic silicone resin in an alkaline environment, wherein the hollow bodies are expanded polystyrene.

2. The method according to claim 1, wherein the hydratable cement comprises calcium sulpho aluminate.

3. The method according to claim 1, wherein the hollow bodies are present in an amount of 0.5 to 2% by weight, based on the weight of settable solids in the settable aqueous calcium sulphate dispersion.

4. The method according to claim 2, wherein the hollow bodies are present in an amount of 0.5 to 2% by weight, based on the weight of settable solids in the settable aqueous calcium sulphate dispersion.

5. A method of producing a lightweight, water-resistant gypsum product, the method comprising:
    forming a gypsum building product selected from gypsum wallboard, and gypsum wall facing by combining with water to produce a settable aqueous calcium sulphate dispersion:
    a settable calcium sulphate, lightweight hollow bodies having water-impervious surfaces, and a hydratable cement which is capable of hydration in the settable aqueous calcium sulphate dispersion, the hydratable cement being reactive with excess water in the dispersion; and
    allowing the settable aqueous calcium sulphate dispersion to set into the gypsum building product;
    wherein the settable aqueous calcium sulphate dispersion has a water to solids ratio of less than 0.4 to 1 and the hydratable cement is 8% to 12% of the settable aqueous calcium sulphate dispersion, based on the weight of the settable solids in the settable aqueous calcium sulphate dispersion;
    wherein the settable aqueous calcium sulphate dispersion contains an amphiphilic compound wherein the hollow bodies are expanded polystyrene.

6. The method according to claim 2 wherein the settable aqueous calcium sulphate dispersion contains an amphiphilic compound.

7. The method according to claim 3, wherein the amphiphilic compound is a soap.

8. The method according to claim 1, wherein the settable aqueous calcium sulphate dispersion further contains glass fibre reinforcement.

9. The method according to claim 1, wherein the gypsum product has surface reinforcement.

10. The method according to claim 2, wherein the gypsum product has surface reinforcement.

11. The method according to claim 3, wherein the gypsum product has surface reinforcement.

12. The method according to claim 4, wherein the gypsum product has surface reinforcement.

13. The method according to claim 5, wherein the gypsum product has surface reinforcement.

14. The method according to claim 1, wherein the gypsum product is produced without externally applied heating.

15. The method according to claim 2, wherein the gypsum product is produced without externally applied heating.

16. The method according to claim 3, wherein the gypsum product is produced without externally applied heating.

17. The method according to claim 4, wherein the gypsum product is produced without externally applied heating.

18. The method according to claim 5, wherein the gypsum product is produced without externally applied heating.

19. The method according to claim 6, wherein the gypsum product is produced without externally applied heating.

20. A method of producing a water-resistant gypsum product, the method comprising:

forming a gypsum building product selected from gypsum wallboard and gypsum wall facing by combining with water to form an aqueous dispersion a gypsum plaster, lightweight hollow bodies with water-impervious surfaces, and a calcium sulpho aluminate cement; and allowing the dispersion to set into the gypsum building product;

wherein the aqueous dispersion has a water to solids ratio of less than 0.35 to 1 and the calcium sulpho aluminate cement is 8% to 12% of the settable aqueous calcium sulphate dispersion, based on the weight of the settable solids in the settable aqueous calcium sulphate dispersion wherein the hollow bodies are expanded polystyrene.

* * * * *